United States Patent
Nandy et al.

(10) Patent No.: US 11,546,184 B2
(45) Date of Patent: Jan. 3, 2023

(54) SELECTING A RENDEZVOUS POINT IN AN IP MULTICAST-CAPABLE NETWORK

(71) Applicant: HEWLETT PACKARD ENTERPRISE DEVELOPMENT LP, Houston, TX (US)

(72) Inventors: Tathagata Nandy, Bangalore (IN); Chethan Chavadibagilu Radhakrishnabhat, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 23 days.

(21) Appl. No.: 17/364,173

(22) Filed: Jun. 30, 2021

(65) Prior Publication Data

US 2022/0345326 A1 Oct. 27, 2022

(30) Foreign Application Priority Data

Apr. 27, 2021 (IN) .............................. 202141019438

(51) Int. Cl.
*H04L 12/18* (2006.01)

(52) U.S. Cl.
CPC ........ *H04L 12/1863* (2013.01); *H04L 12/185* (2013.01)

(58) Field of Classification Search
CPC ... H04L 12/18; H04L 12/185; H04L 12/1863; H04L 45/16
See application file for complete search history.

(56) References Cited

U.S. PATENT DOCUMENTS

| 10,277,464 | B2 | 4/2019 | Yang et al. | |
|---|---|---|---|---|
| 10,454,766 | B2 | 10/2019 | Jailani | |
| 10,554,494 | B1 | 2/2020 | Thakor et al. | |
| 10,581,688 | B2 | 3/2020 | Li et al. | |
| 10,862,794 | B2 | 12/2020 | Singal et al. | |
| 2004/0218536 | A1* | 11/2004 | Yasukawa | H04L 45/124 370/238 |
| 2006/0182049 | A1* | 8/2006 | Rokui | H04L 12/185 370/312 |
| 2006/0291444 | A1* | 12/2006 | Alvarez | H04L 45/16 370/351 |
| 2012/0176934 | A1* | 7/2012 | Farinacci | H04L 61/103 370/254 |
| 2017/0346721 | A1* | 11/2017 | Bacthu | H04L 45/16 |

* cited by examiner

*Primary Examiner* — Nicholas P Celani
(74) *Attorney, Agent, or Firm* — Hewlett Packard Enterprise Patent Department

(57) ABSTRACT

Some examples relate to selection of a rendezvous point in an IP multicast network managing multicast group traffic. An example includes transmitting, from a controller in a cloud computing system, messages to a source device and a host device in an IP multicast-capable network, which may include two peer network devices that are virtualized to function as one virtual device. Based on the response to the messages, the controller may determine that the source device is present in OSI layer 3 and the host device is present in OSI layer 2. The controller may determine that the peer network are located downstream in relation to the determined layer of the source device. The controller may select a non-peer network device as a rendezvous point in the IP multicast-capable network. Further to the selection, the controller may synchronize an active-active configuration between the peer network devices.

19 Claims, 6 Drawing Sheets

SELECTING A RENDEZVOUS POINT IN AN IP MULTICAST-CAPABLE NETWORK

BACKGROUND

Multicast technology is being increasingly favored to provide rich content over a network. Multicast is a mechanism for transmitting data from a single source (for example, a server) to multiple receivers (for example, personal computers) on a network. Multicast packets are replicated down appropriate paths in a network to create the most efficient routing mechanism possible. The sender may send a data packet once, even if the packet is to be delivered to multiple receivers.

BRIEF DESCRIPTION OF THE DRAWINGS

The following detailed description references the drawings, wherein.

DETAILED DESCRIPTION

Figure 1:
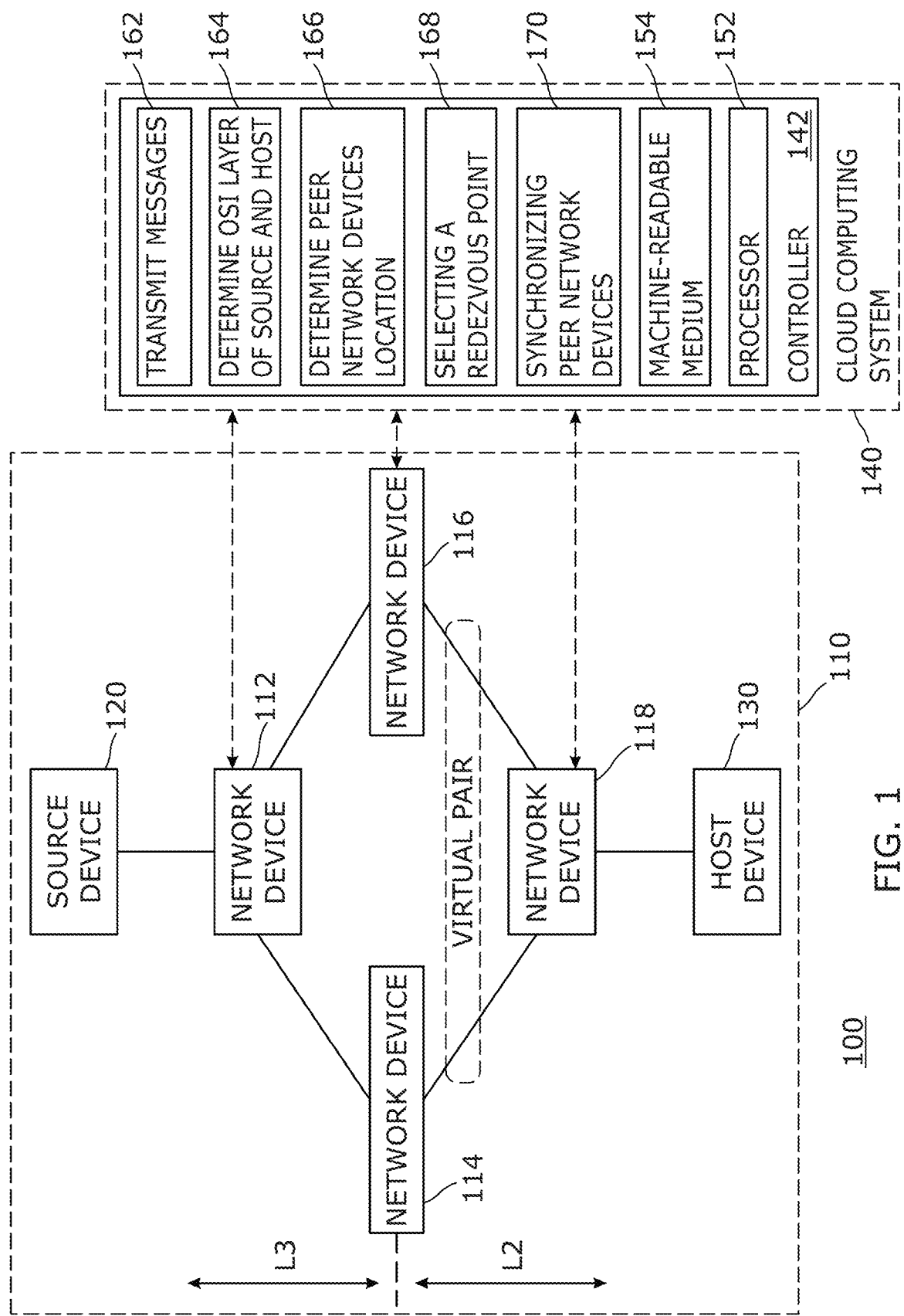
FIG. 1 is a block diagram of an example computing environment for selecting a rendezvous point in an IP multicast network.

Multicast technology may be used by organizations to send data (especially, multimedia content) over a network. Multicast technology allows host computer systems, who have subscribed to a particular content data flow of a content server, to receive the content. Host systems may signify their willingness to receive a particular data from a content server by joining a particular multicast group. Once host systems join a particular group, a multicast distribution tree is created for that group. The flow of data from a multicast source system to receiver devices may be managed by a multicast protocol such as Internet Group Management Protocol (IGMP), Multicast Listener Discovery (MLD) protocol, Protocol Independent Multicast (PIM), and Distance Vector Multicast Routing Protocol (DVMRP).

IP multicast is a method of sending Internet Protocol (IP) datagrams to a group of interested receivers in a single transmission. In IP multicast networks, traffic is delivered to multicast groups based on an IP multicast address, or group address. IP multicast, which is described in Request for Comments (RFC) 1112, could be used for streaming media and other applications.

In a typical network topology, a network feature may be statically configured by a network administrator. However, a static configuration sometimes may cause more harm than help. A case in point is the selection of a Rendezvous Point (RP) in an IP multicast network. A rendezvous point is a network device (e.g., a router) that is used as a point to match a host device subscribing to a multicast group, with a source device of the multicast group. An error in the selection of a rendezvous point may result in an inefficient movement of multicast traffic and affect network performance. It may be desirable if a rendezvous point in an IP multicast network is selected considering other network factors such as positioning of other devices (e.g., host devices, source devices, etc.) in the network topology. For example, considering the OSI layer (e.g., layer 2 or layer 3) of a source device in the network, and the like. Accordingly, a solution for selecting a rendezvous point in an IP multicast-capable network may be useful.

In at least one example, a method for selecting a rendezvous point in an IP multicast-capable network may include transmitting, from a controller in a cloud computing system, messages to a source device and a host device in an IP multicast-capable network. The IP multicast-capable network may include two peer network devices that are virtualized to function as one virtual device. Based on the response to the messages, the controller may determine that the source device is present in layer 3 of Open Systems Interconnection (OSI) layers in the IP multicast-capable network and the host device is present in layer 2 of the OSI layers. The controller may also determine that the peer network devices in the IP multicast-capable network are located downstream in relation to the determined layer of the source device. In response to the determination, the controller may select a non-peer network device as a rendezvous point in the IP multicast-capable network. Further to the selection, the controller may synchronize an active-active configuration between the peer network devices to route multicast traffic to downstream devices in the IP multicast-capable network. The active-active configuration enables the multicast traffic from a failed network device to failover to a functional peer network device if one of the peer network devices fails.

FIG. 1 is a block diagram of an example computing environment 100 for selecting a rendezvous point in an IP multicast network. In an example, computing environment 100 may include an IP multicast-capable network 110 and a cloud computing system 140. In an example, the IP multicast-capable network 110 may include network devices 112, 114, 116, and 118, a multicast source device 120, and a host device 130. Although four network devices, one source device, and one host device are shown in FIG. 1, other examples of this disclosure may include more or fewer than four network devices, more than one source device, and more than one host device.

In an example, network devices 112, 114, 116, and 118 may each include, for example, a network router, a network switch, a virtual router, or a virtual switch. In an example, network devices 114 and 116 may act as peer network devices that are virtualized to function as one virtual device using a virtualization technology (e.g., MC-LAG). Multi-Chassis Link Aggregation Groups (MC-LAGs) enable a client device to form a logical LAG interface between two MC-LAG peer devices. MC-LAG is a type of LAG with constituent ports that terminate on separate chassis, primarily for the purpose of providing redundancy in the event one of the chassis fails. MC-LAG adds node-level redundancy to the normal link-level redundancy that a LAG provides. This allows two or more nodes to share a common LAG endpoint. The multiple nodes present a single logical LAG to a remote end.

In an example, network devices 114 and 116 are virtualized to act as one virtualized switch. In an example, the control plane of peer network devices (e.g., 114 and 116)

may be virtualized to function as one device at Open Systems Interconnection (OSI) layer 2 and as independent devices at OSI layer 3.

OSI model is a conceptual framework that describes the functions of a networking or telecommunication system. Developed by the International Standards Organization (ISO), the OSI model divides network communication into seven layers, which outline how applications communicate throughout a network.

Layer 3 of OSI model is the Network Layer. The primary role of the Network Layer is to handle packet forwarding which includes the routing of data. Network devices at the Networking Layer help direct data to its destination between several different networks.

Layer 2 of OSI model is the Data Link Layer. The Data Link Layer is responsible for setting up links across a physical network. The Data Link Layer provides node-to-node data transfer. It also manages error correction from the physical layer before packaging the data into frames.

From a datapath perspective, each peer network device (e.g., 114 and 116) may perform an independent forwarding lookup to decide how to handle traffic. Forwarding databases, such as the media access control address (MAC address) and Address Resolution Protocol (ARP) tables may be synchronized between the peer network devices 114 and 116 using a proprietary control plane. In an example, network devices 114 and 116 may each be, for example, aggregation or core network switches. Aggregation switches are typically used to connect a number of access switches to a core switch. A core switch is a high-capacity switch positioned within the backbone of a network to serve as the gateway to a wide area network (WAN) or the Internet.

In an example, the cloud computing system 140 may include a controller 142. As used herein, the term "cloud computing system" (or "cloud") may refer to an on-demand network access to a shared pool of information technology resources (e.g., networks, servers, storage, and/or applications). The cloud computing system may include a public cloud system, a private cloud system, or a hybrid cloud system.

As used herein, a "controller" 142 may include a server, a computing device, a network device (e.g., a network router), a virtualized device, a mobile phone, a tablet or any other processing device. A "controller" 142 may include software (machine-readable instructions), a dedicated hardware, or a combination thereof.

In an example, multicast source device 120 may include a computing device (e.g., a server). The multicast source device 120 may host multicast content, which may include, for example, data, image, audio, video, multimedia, and other like content. Multicast content may be shared with host devices (e.g., host device 130), for example, via one or more network devices 112, 114, 116, and/or 118.

Multicast technology allows host devices (e.g., 130), who have subscribed to a particular content, to receive the content from a source device. Host devices (e.g., 130) signify their willingness to receive a particular data from a source device (e.g., 120) by joining a particular multicast group. Once a host device joins a particular group, a multicast distribution tree may be created for that group. The flow of data from a multicast source device (e.g., 120) to host devices (e.g., 130) over a multicast-capable network is managed by a multicast protocol. Examples of the multicast protocol include Internet Group Management Protocol (IGMP) and Multicast Listener Discovery (MLD) protocol.

In an example, multicast source device 120, network devices 112, 114, 116, and 118, host device 130, and cloud computing system 140 may be communicatively coupled, for example, via a computer network. The computer network may be a wireless or wired network. The computer network may include, for example, a Local Area Network (LAN), a Wireless Local Area Network (WLAN), a Metropolitan Area Network (MAN), a Storage Area Network (SAN), a Campus Area Network (CAN), or the like. Further, the computer network may be a public network (for example, the Internet) or a private network (for example, an intranet).

In an example, controller 142 may include a processor 152 and a machine-readable storage medium 154 communicatively coupled through a system bus. In an example, machine-readable storage medium 154 may store machine-readable instructions (i.e. program code) such as instructions 162, 164, 166, 168, and 170 that, when executed by processor 152, may at least partially implement some or all functionalities described herein in relation to FIG. 1.

Processor 152 may be any type of Central Processing Unit (CPU), microprocessor, or processing logic that interprets and executes machine-readable instructions stored in machine-readable storage medium 154. Machine-readable storage medium 154 may be a Random Access Memory (RAM) or another type of dynamic storage device that may store information and machine-readable instructions that may be executed by processor 152. For example, machine-readable storage medium 154 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 154 may be a non-transitory machine-readable storage medium.

Instructions 162 may be executed by processor 152 of controller 140 to transmit messages to a source device (e.g., 120) and a host device (e.g., 130) in an IP multicast-capable network (e.g., 110). In an example, the messages may be transmitted to determine the Open Systems Interconnection (OSI) layer in which source device 120 and host device 130 are located. In an example, the messages may be transmitted in the form of Representational State Transfer (REST) messages. Controller 142 may use a RESTful service to query the source device 120 and/or the host device 130 through REST messages. The RESTful service may use, for example, the Hypertext Transfer Protocol (HTTP) or Hypertext Transfer Protocol Secure (HTTPS) web protocols to access source device 120 and/or host device 130.

Based on the response to the messages, instructions 164 may be executed by processor 152 of controller 142 to determine the OSI layer of source device 120 and host device 130 in the IP multicast-capable network 110. In an example, instructions 164 may cause controller 142 to determine that source device 120 is present in OSI layer 3 and host device 130 is present in OSI layer 2 of the IP multicast-capable network.

Instructions 166 may be executed by processor 152 of controller 142 to determine the location of peer network devices 114 and 116 in the IP multicast-capable network 110 in relation to the determined layer of source device 120. In an example, if instructions 164, when executed by processor 152, cause controller 142 to determine that source device 120 is present in OSI layer 3, then instructions 166 may cause controller 142 to determine whether peer network devices 114 and 116 are located downstream in relation to source device 120 in the IP multicast-capable network 110. In an example, controller 142 may transmit messages (e.g., RESTful messages) to peer network devices 114 and 116 to determine their location in relation to the determined layer (i.e. OSI layer) of source device 120.

In response to a determination that peer network devices 114 and 116 are located downstream in relation to source device 120, which is present in OSI layer 3 of the IP multicast-capable network 110, instructions 168 may be executed by processor 152 of controller 142 to select a non-peer network device as a Rendezvous Point (RP) in the IP multicast-capable network. In other words, a network device other than peer network devices (i.e. 114 and 116) may be selected as an RP in the IP multicast-capable network 110 by controller 142. As defined herein, a "RP" may include a network device that is used as a point to match a host device (e.g., 130) subscribing to a multicast group, with a source device (e.g., 120) of the multicast group, in a multicast-capable network (e.g., 110). AN RP receives multicast traffic destined for a multicast group. All multicast traffic must pass through the RP As described above, an error in the selection of a rendezvous point may result in an inefficient movement of multicast traffic and affect network performance. It may be desirable if a rendezvous point in an IP multicast network is automatically selected considering other network factors such as positioning of other devices (e.g., a source devices) in the network topology. In response to the selection of a non-peer network device as an RP, instructions 170 may be executed by processor 152 of controller 142 to configure peer network devices 114 and 116 in a manner that load balances traffic distribution between these two devices. In an example, instructions 170 may include instructions to synchronize an active-active configuration between peer network devices 114 and 116 to route multicast traffic to downstream devices in the IP multicast-capable network 110. An active-active configuration in peer network devices 114 and 116 enables the multicast traffic from a failed network device to failover to a functional peer network device, if one of the peer network devices (e.g., 114 or 116) fails. An active-active configuration provides high availability (HA) of network devices (e.g., 114 and 116). In an active-active configuration, both network devices (e.g., 114 and 116) actively run the same kind of service(s) simultaneously. An active-active configuration may be used to achieve load balancing. Load balancing spreads out the workloads across both network devices (e.g., 114 and 116) in order to prevent any single network device from getting overloaded.

In another example, instructions 170 may include instructions to synchronize Internet Group Management Protocol (IGMP) join requests between peer network devices 114 and 116. IGMP may be used to manage the membership of host devices (e.g., 130) and routing devices in multicast groups. Host devices (e.g., 130) may use IGMP to report their multicast group memberships to neighboring multicast routing devices. In the IGMP join process, when a host device (e.g., 130) wants to join a multicast group, the host device sends one or more membership reports (join requests) for the multicast group it wants to join. Controller 142 may synchronize IGMP join requests between peer network devices 114 and 116.

In another example, instructions 170 may include instructions to synchronize Protocol Independent Multicast (PIM) states between peer network devices 114 and 116. Protocol Independent Multicast (PIM) is a collection of multicast routing protocols and PIM states is the information used for forwarding multicast packets. Examples of PIM states include (*, G) state—a state that maintains the RP tree for group G, and (S,G) state—a state that maintains a source-specific tree for source S and group G. Controller 142 may synchronize PIM states between peer network devices 114 and 116 for the devices to keep track of the multicast forwarding state for the incoming and outgoing interfaces for each multicast group.

Figure 2:
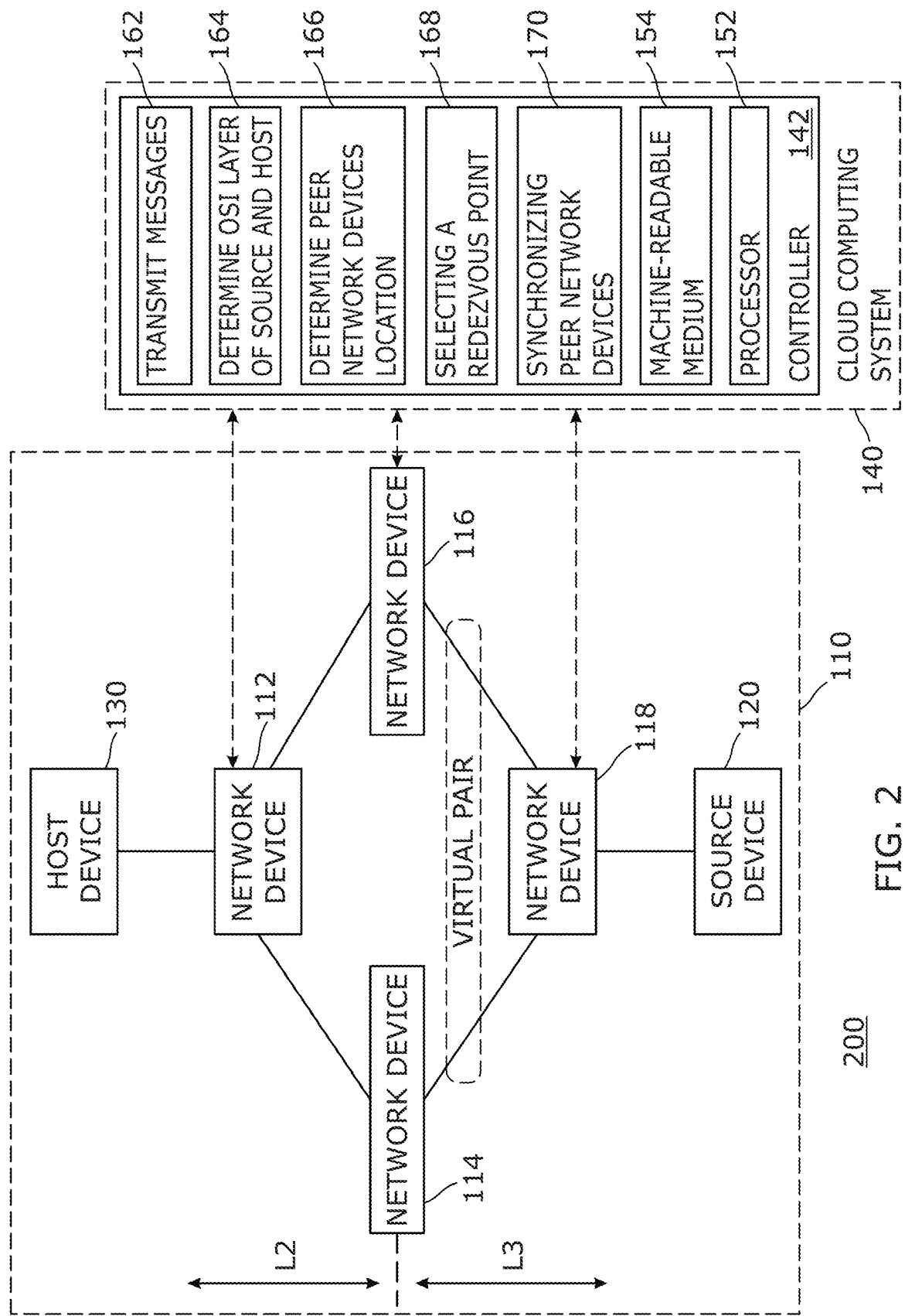
FIG. 2 is a block diagram of another example computing environment for selecting a rendezvous point in an IP multicast network.

In an example, instructions 164 may cause controller 142 to determine that source device 120 is present in OSI layer 2 and host device 130 is present in OSI layer 3 of the IP multicast-capable network 110. This network topology 200 is illustrated in FIG. 2, by way of an example. In an example, if instructions 164 cause controller 142 to determine that source device 120 is present in OSI layer 2, then instructions 166 may cause controller 142 to determine whether peer network devices 114 and 116 are located upstream in relation to source device 120 in the IP multicast-capable network. As used herein, the term "upstream" refers to the direction towards a host device in the IP multicast-capable network. In contrast, as used herein, the term "downstream" refers to the direction away from a host device in the IP multicast-capable network. In an example, controller 142 may transmit messages (e.g., RESTful messages) to peer network devices 114 and 116 to determine their location in relation to the determined layer (i.e. OSI layer) of source device 120.

In response to a determination that peer network devices 114 and 116 are located upstream in relation to source device 120, which is present in OSI layer 2 of the IP multicast-capable network 110, instructions 168 may be executed by processor 152 of controller 142 to select peer network devices 114 and 116 as a rendezvous point (RP) in the IP multicast-capable network 110. In other words, each of the peer network devices 114 and 116 may be selected as an RP in the IP multicast-capable network 110.

In response to the selection of peer network devices 114 and 116 as an RP, instructions 170 may be executed by processor 152 of controller 142 to synchronize PIM states between peer network devices 114 and 116. Instructions 170 may also include instructions to not enable active-active configuration between peer network devices 114 and 116. Instructions 170 may also include instructions to enable Multicast Source Discovery Protocol (MSDP) on peer network devices 114 and 116. The Multicast Source Discovery Protocol (MSDP) is used to connect multicast routing domains. It is meant to address the interconnection among multiple Protocol Independent Multicast Sparse Mode (PIM-SM) domains. Enabling MSDP allows both peer network devices 114 and 116 that are acting as an RP to identify various source devices (e.g., 120) in the IP multicast-capable network 110. MSDP may be used to provide inter-domain access to multicast source devices (e.g., 120) in all domains by enabling all rendezvous points (i.e. peer network devices 114 and 116, in the present example) to discover multicast sources outside of their domains. If a multicast source device (e.g., 120) is of interest to a domain which has host devices, the source-tree building mechanism in PIM-SM may be used to deliver multicast data over an inter-domain distribution tree by using MSDP.

Instructions 170 may include instructions to configure Anycast RP on peer network devices 114 and 116. Anycast RP is used to create RP redundancy. Through Anycast RP, a single IP address is configured on peer network devices 114 and 116, which ensures that source devices (e.g., 120) and host devices (e.g., 130) are routed to the closest RP (i.e. 114 or 116) based on the unicast routing table.

Figure 3:
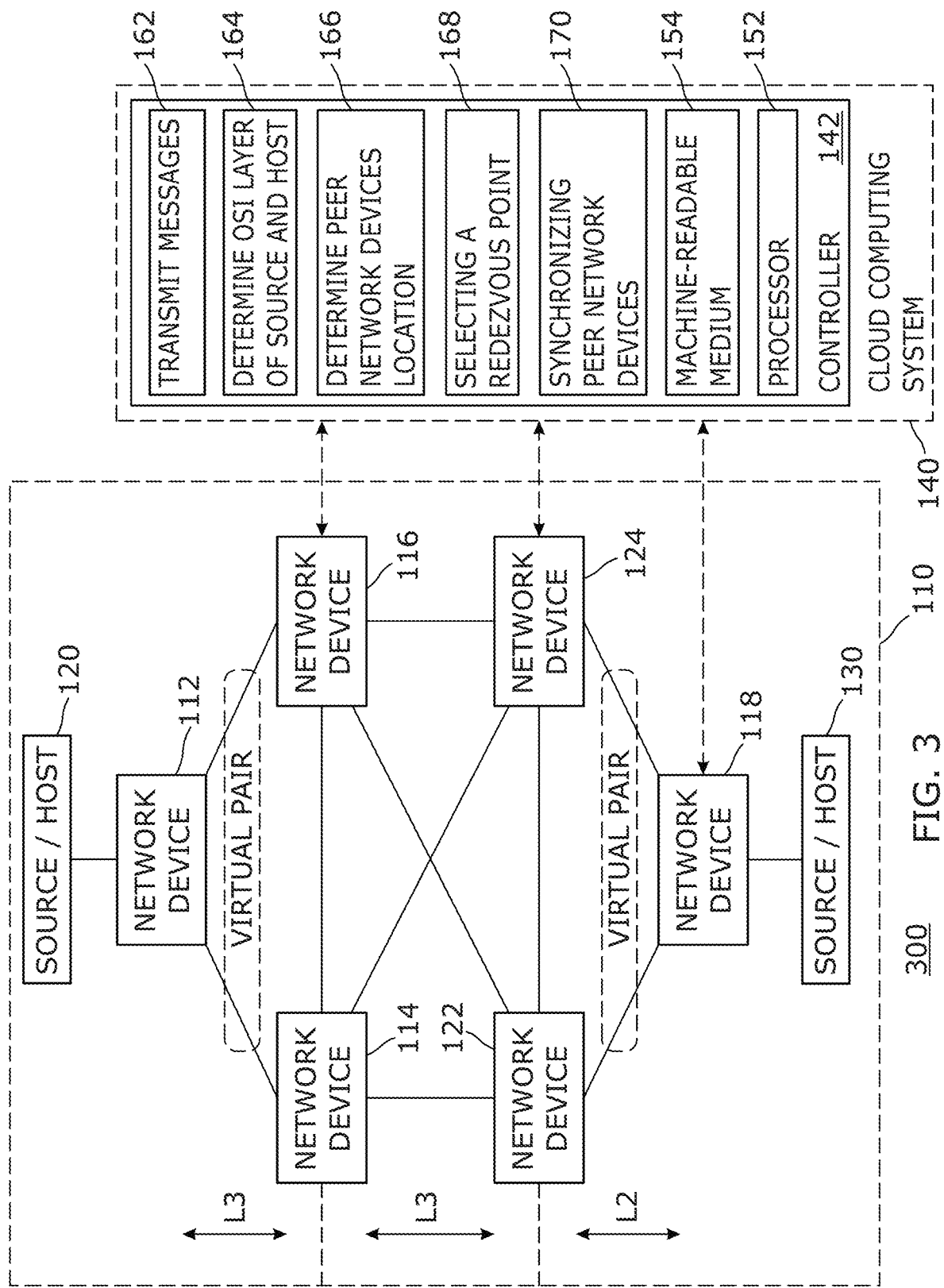
FIG. 3 is a block diagram of another example computing environment for selecting a rendezvous point in an IP multicast network

In an example, the IP multicast-capable network 110 may include a second pair of peer network devices 122 and 124 (in addition to peer network devices 114 and 116) that are virtualized to function as one virtual device. The second pair of peer network devices 122 and 124 may be layer 3 devices that are located downstream in relation to peer network devices 114 and 116. This network topology 300 is illustrated in FIG. 3, by way of an example. In such a scenario, instructions 164 may determine whether more source devices are located downstream in relation to second pair of peer network devices 122 and 124. In an example, controller 142 may transmit messages (e.g., RESTful messages) to source devices to determine their location in relation to second pair of peer network devices 122 and 124. In response to a determination that more source devices (e.g., 120) are located downstream in relation to second pair of peer network devices 122 and 124, instructions 168 may select second pair of peer network devices 122 and 124 as an RP in the IP multicast-capable network 110. This would enable the RP to be closer to source devices and would bring efficiency to the movement of multicast traffic in the network 110.

In another example related to network topology illustrated by FIG. 3, instructions 164 may determine whether more source devices (e.g., 120) are located upstream in relation to second pair of peer network devices 122 and 124. In response to a determination that more source devices are located upstream in relation to second pair of peer network devices, instructions 168 may select peer network devices 114 and 116 as an RP in the IP multicast-capable network 110. In this scenario also, it would enable the RP to be closer to source devices and lead to efficiency in multicast traffic movement within the network 110.

Figure 4:
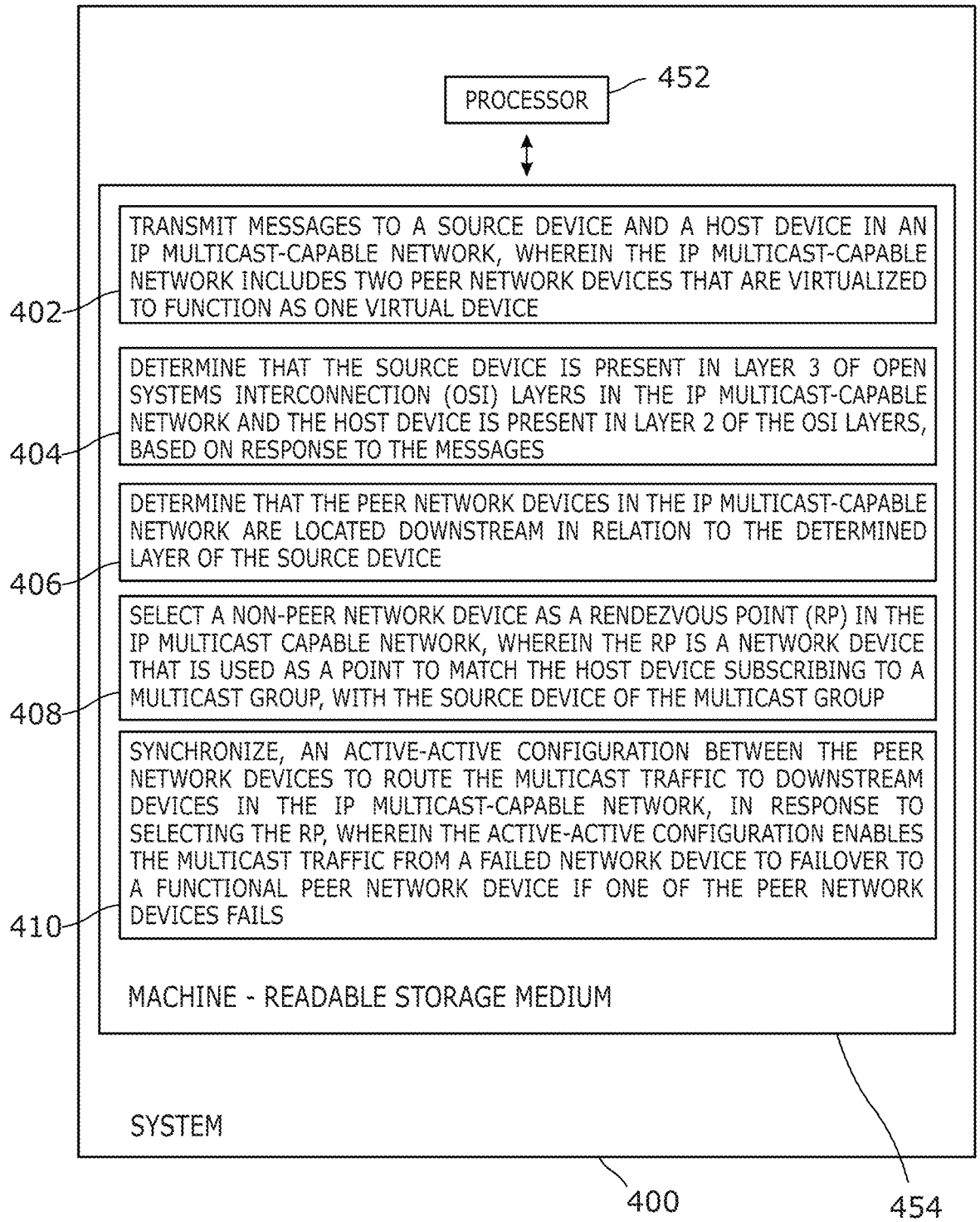
FIG. 4 is a block diagram of an example system for selecting a rendezvous point in an IP multicast network.

Referring now to FIG. 4, which is a block diagram of an example system 400 for selecting a rendezvous point in an IP multicast network. In an example, system 400 may be analogous to controller 142 of FIG. 1, in which like reference numerals correspond to the same or similar, though perhaps not identical, components. For the sake of brevity, components or reference numerals of FIG. 4 having a same or similarly described function in FIG. 1 are not being described in connection with FIG. 4. The components or reference numerals may be considered alike.

As used herein, a "system" may include a server, a computing device, a network device (e.g., a network router), a virtualized device, a mobile phone, a tablet or any other processing device. A "system" may include software (machine-readable instructions), a dedicated hardware, or a combination thereof.

In an example, system 400 may include a processor 452 and a machine-readable storage medium 454 communicatively coupled through a system bus. Processor 452 may be any type of Central Processing Unit (CPU), microprocessor, or processing logic that interprets and executes machine-readable instructions stored in machine-readable storage medium 454.

Machine-readable storage medium 454 may be a random access memory (RAM) or another type of dynamic storage device that may store information and machine-readable instructions that may be executed by processor 452. For example, machine-readable storage medium 454 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 454 may be a non-transitory machine-readable medium.

In an example, machine-readable storage medium 454 may store machine-readable instructions (i.e. program code) 402, 404, 406, 408, and 410 that, when executed by processor 452, may at least partially implement some or all functionalities described herein in relation to FIG. 4.

In an example, instructions 402 may be executed by processor 452 of system 400 to transmit messages to a source device (e.g., 120) and a host device (e.g., 130) in an IP multicast-capable network 110. The IP multicast-capable network may include two peer network devices (e.g., 114 and 116) that are virtualized to function as one virtual device. Instructions 404 may be executed by processor 452 of controller 400 to determine that the source device is present in layer 3 of Open Systems Interconnection (OSI) layers in the IP multicast-capable network and the host device is present in layer 2 of the OSI layers, based on the response to the messages.

Instructions 406 may be executed by processor 452 of controller 400 to determine that the peer network devices in the IP multicast-capable network are located downstream in relation to the determined layer (e.g., OSI layer) of the source device. Instructions 406 may be executed by processor 452 of controller 400 to select a non-peer network device as an RP in the IP multicast-capable network. Instructions 406 may be executed by processor 452 of controller 400 to synchronize, an active-active configuration between the peer network devices to route the multicast traffic to downstream devices in the IP multicast-capable network, in response to selecting the RP.

Figure 5:
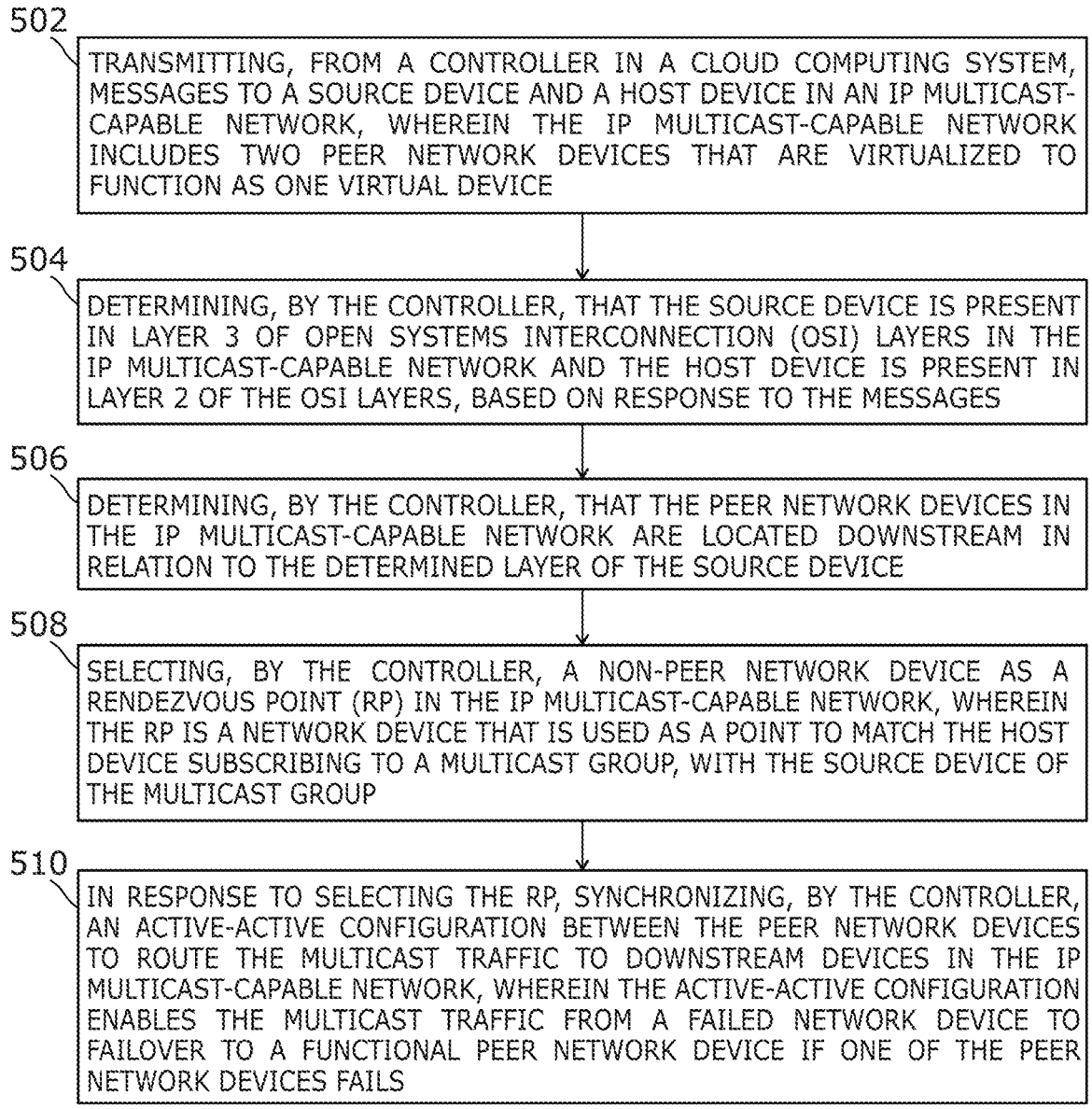
FIG. 5 is a flowchart of an example method of selecting a rendezvous point in an IP multicast network.

FIG. 5 is a flowchart of an example method 500 of selecting a rendezvous point in an IP multicast network. The method 500, which is described below, may at least partially be executed on controller 142 of FIG. 1. However, other processing devices may be used as well.

At block 502, processor 152 may execute instructions 162 to transmit messages to a source device (e.g., 120) and a host device (e.g., 130) in the IP multicast-capable network (e.g., 110). In an example, the messages may be sent to determine the OSI layer in which the source device and the host device may be located. In an example, the messages may be transmitted in the form of REST messages.

Based on the response to the messages, at block 504, processor 152 may execute instructions 164 to determine the OSI layer of the source device and the host device in the IP multicast-capable network. In an example, instructions 164 may determine that the source device is present in OSI layer 3 and the host device is present in OSI layer 2 of the IP multicast-capable network.

At block 506, processor 152 may execute instructions 166 to determine the location of the peer network devices in the IP multicast-capable network in relation to the determined layer (i.e., OSI layer) of the source device. In an example, if instructions 164 determine that the source device is present in OSI layer 3, then at block 506, processor 152 may execute instructions 166 to determine whether the peer network devices are located downstream in relation to the source device in the IP multicast-capable network.

In response to a determination that the peer network devices are located downstream in relation to the source device, which is present in OSI layer 3 of the IP multicast-capable network, at block 508, processor 152 may execute instructions 168 to select a non-peer network device as RP in the IP multicast-capable network.

In response to the selection of a non-peer network device as an RP, at block 510, processor 152 may execute instructions 170 to synchronize an active-active configuration between the peer network devices to route multicast traffic to downstream devices in the IP multicast-capable network.

Figure 6:
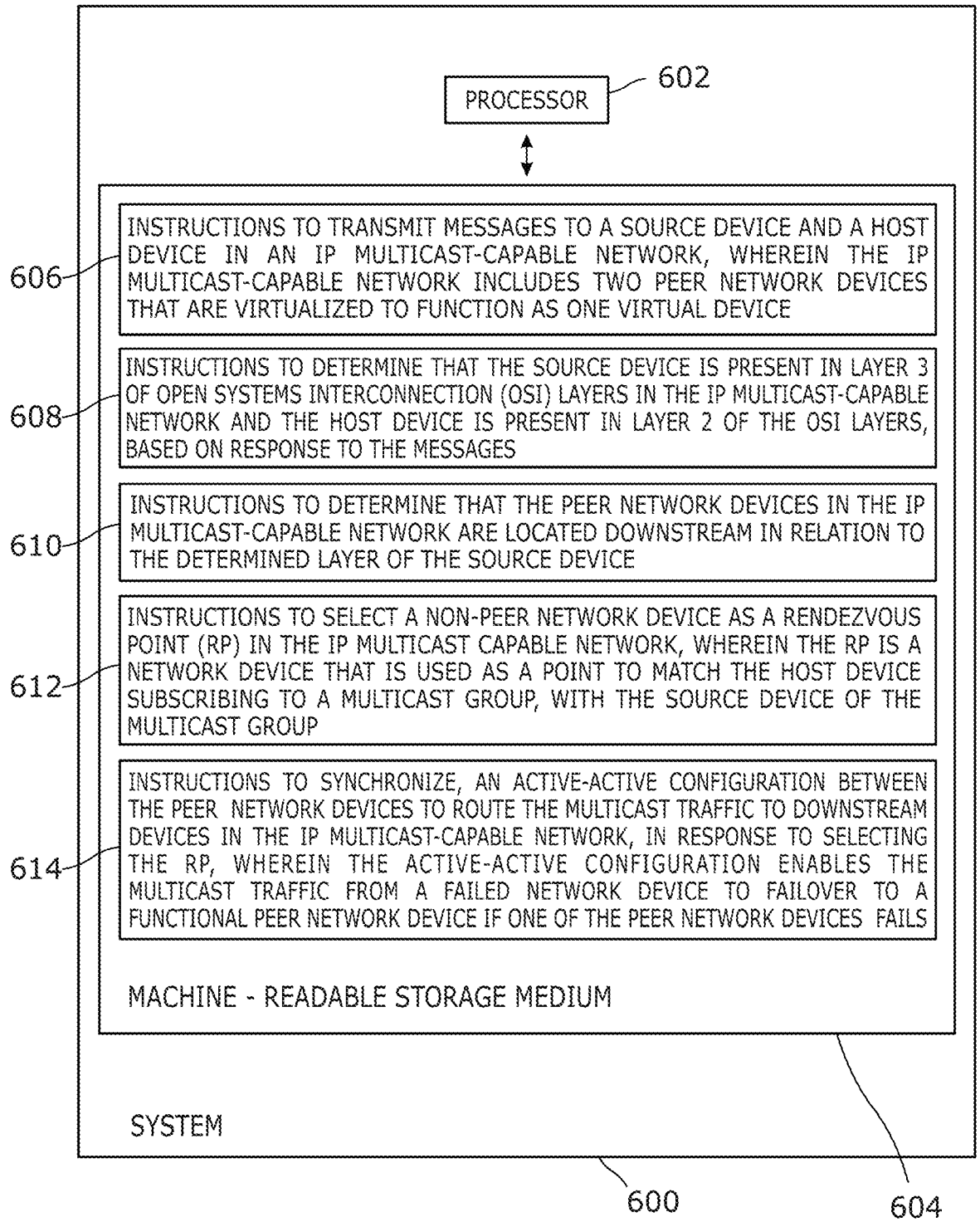
FIG. 6 is a block diagram of an example system including instructions in a machine-readable storage medium for selecting a rendezvous point in an IP multicast network.

FIG. 6 is a block diagram of an example system 600 for selecting a rendezvous point in an IP multicast network.

System 600 includes a processor 602 and a machine-readable storage medium 604 communicatively coupled through a system bus. In an example, system 600 may be analogous to controller 142 of FIG. 1 or system 400 of FIG. 4. Processor 602 may be any type of Central Processing Unit (CPU), microprocessor, or processing logic that interprets and executes machine-readable instructions stored in machine-readable storage medium 604. Machine-readable storage medium 604 may be a random access memory (RAM) or another type of dynamic storage device that may store information and machine-readable instructions that may be executed by processor 602. In an example, machine-readable storage medium 604 may be a non-transitory machine-readable medium. Machine-readable storage medium 604 may store instructions 606, 608, 610, 612, and 614.

In an example, instructions 606 may be executed by processor 602 to transmit messages to a source device (e.g., 120) and a host device (e.g., 130) in an IP multicast-capable network (e.g., 110), wherein the IP multicast-capable network includes two peer network devices (e.g., 114 and 116) that are virtualized to function as one virtual device. Instructions 608 may be executed by processor 602 to determine that the source device is present in layer 3 of OSI layers in the IP multicast-capable network and the host device is present in layer 2 of the OSI layers, based on the response to the messages.

Instructions 610 may be executed by processor 602 to determine that the peer network devices in the IP multicast-capable network are located downstream in relation to the determined layer (i.e., OSI layer) of the source device. Instructions 612 may be executed by processor 602 to select a non-peer network device as a rendezvous point in the IP multicast-capable network.

Instructions 614 may be executed by processor 602 to synchronize, an active-active configuration between the peer network devices to route the multicast traffic to downstream devices in the IP multicast-capable network, in response to the selection of the RP.

For the purpose of simplicity of explanation, the example method of FIG. 5 is shown as executing serially, however it is to be understood and appreciated that the present and other examples are not limited by the illustrated order. The example systems of FIGS. 1, 2, 3, 4, and 6, and method of FIG. 5 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution are for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the parts of any method or process so disclosed, may be combined in any combination, except combinations where at least some of such features and/or parts are mutually exclusive.

We claim:

1. A method comprising:

transmitting, from a controller in a cloud computing system, messages to a source device and a host device in an IP multicast-capable network, wherein the IP multicast-capable network includes two peer network devices that are virtualized to function as one virtual device;

determining, by the controller, that the source device is present in layer 3 of Open Systems Interconnection (OSI) layers in the IP multicast-capable network and the host device is present in layer 2 of the OSI layers, based on response to the messages;

determining, by the controller, that the peer network devices in the IP multicast-capable network are located downstream in relation to the determined layer of the source device;

selecting, by the controller, based on the determination that the peer network devices in the IP multicast-capable network are located downstream in relation to the determined layer of the source device, a non-peer network device as a Rendezvous Point (RP) in the IP multicast-capable network, wherein the RP is a network device that is used as a point to match the host device subscribing to a multicast group, with the source device of the multicast group; and in response to selecting the RP, synchronizing, by the controller, an active-active configuration between the peer network devices to route the multicast traffic to downstream devices in the IP multicast-capable network, wherein the active-active configuration enables the multicast traffic from a failed network device to failover to a functional peer network device if one of the peer network devices fails.

2. The method of claim 1, comprising:

synchronizing, by the controller, Internet Group Management Protocol (IGMP) join requests between the peer network devices.

3. The method of claim 1, comprising:

synchronizing, by the controller, Protocol Independent Multicast (PIM) states between the peer network devices.

4. The method of claim 1, wherein the IP multicast-capable network includes a second pair of peer network devices that are virtualized to function as one virtual device and are located downstream in relation to the peer network devices.

5. The method of claim 4, comprising:

determining, by the controller, whether more source devices are located downstream in relation to the second pair of peer network devices; and in response to determining that more source devices are located downstream in relation to the second pair of peer network devices, selecting, by the controller, the second pair of peer network devices as the RP in the IP multicast-capable network.

6. The method of claim 1, wherein the peer network devices include aggregation network switches.

7. The method of claim 1, wherein the multicast traffic is muted to the downstream devices in the IP multicast capable network by one of the peer network devices.

8. A system comprising:
a processor; and
a machine-readable medium storing instructions that, when executed by the processor, cause the processor to:
transmit messages to a source device and a host device in an IP multicast-capable network, wherein the IP multicast-capable network includes two peer network devices that are virtualized to function as one virtual device;
determine that the source device is present in layer 3 of Open Systems Interconnection (OSI) layers in the IP multicast-capable network and the host device is present in layer 2 of the OSI layers, based on response to the messages;
determine that the peer network devices in the IP multicast-capable network are located downstream in relation to the determined layer of the source device;
select, based on the determination that the peer network devices in the IP multicast-capable network are located downstream in relation to the determined layer of the source device, a non-peer network device as a Rendezvous Point (RP) in the IP multicast-capable network, wherein the RP is a network device that is used as a point to match the host device subscribing to a multicast group, with the source device of the multicast group; and
synchronize, an active-active configuration between the peer network devices to mute the multicast traffic to downstream devices in the IP multicast-capable network, in response to selecting the RP, wherein the active-active configuration enables the multicast traffic from a failed network device to failover to a functional peer network device if one of the peer network devices fails.

9. The system of claim 8, wherein the messages include Representational state transfer (REST) messages.

10. The system of claim 8, wherein a control plane of the peer network devices is virtualized to function as one device in layer 2.

11. The system of claim 8, wherein a control plane of the peer network devices is virtualized to function as independent devices in layer 3.

12. The system of claim 8, wherein the peer network devices include core network switches.

13. The system of claim 8, wherein the peer network devices include network routers.

14. A non-transitory machine-readable storage medium comprising instructions, the instructions executable by a processor of a system to:
transmit messages to a source device and a host device in an IP multicast-capable network, wherein the IP multicast-capable network includes two peer network devices that are virtualized to function as one virtual device;
determine that the source device is present in layer 3 of Open Systems Interconnection (OSI) layers in the IP multicast-capable network and the host device is present in layer 2 of the OSI layers, based on response to the messages;
determine that the peer network devices in the IP multicast-capable network are located downstream in relation to the determined layer of the source device;
select, that the peer network devices in the IP multicast-capable network are located downstream in relation to the determined layer of the source device, a non-peer network device as a Rendezvous Point (RP) in the IP multicast-capable network, wherein the RP is a network device that is used as a point to match the host device subscribing to a multicast group, with the source device of the multicast group; and
synchronize, an active-active configuration between the peer network devices to route the multicast traffic to downstream devices in the IP multicast-capable network, in response to selecting the RP, wherein the active-active configuration enables the multicast traffic from a failed network device to failover to a functional peer network device if one of the peer network devices fails.

15. The storage medium of claim 14, comprising instructions to synchronize Internet Group Management Protocol (IGMP) join requests between the peer network devices.

16. The storage medium of claim 14, comprising instructions to synchronize Protocol Independent Multicast (PIM) states between the peer network devices.

17. The storage medium of claim 14, wherein the peer network devices include aggregation network switches.

18. The storage medium of claim 14, wherein a control plane of the peer network devices is virtualized to function as one device in layer 2.

19. The storage medium of claim 14, wherein the non-peer network device is one of a network router and a network switch.

* * * * *